Dec. 17, 1963 R. A. WARREN 3,114,659
VOLTAIC CELL WITH VENTING VALVE
Filed Jan. 2, 1962

INVENTOR.
Robert A. Warren
BY
Davis, Robertson & Vandenburgh
Attys.

United States Patent Office 3,114,659
Patented Dec. 17, 1963

3,114,659
VOLTAIC CELL WITH VENTING VALVE
Robert A. Warren, Center Line, Mich., assignor to Servel, Inc., Evansville, Ind., a corporation of Delaware
Filed Jan. 2, 1962, Ser. No. 163,562
1 Claim. (Cl. 136—178)

This invention relates to a diaphragm valve adapted to remain in a hermetically sealed condition during normal operation of the device with which it is associated, but which permits the escape of fluid therethrough after a fluid pressure differential of predetermined value across the valve has been attained.

The invention more particularly relates to a valve for air-tight or hermetically sealed enclosures for voltaic cells which permit the relief venting of gases formed within the cell when an abnormally high gas pressure has been built up within the cell enclosure.

Although the invention is applicable to all types of voltaic cells, it is especially suitable for use in the construction of containers for cells utilizing alkaline electrolyte, where gas formation resulting in excessive internal pressures is frequently encountered.

Various types of alkaline cells are currently in widespread use. The characteristics common to all is that they utilize an electrolyte comprised of an aqueous solution of an alkali metal hydroxide as for example potassium hydroxide. The alkaline cells may be further categorized as either primary cells or secondary cells. The primary alkaline cell most commonly used has a zinc anode, preferably in the form of amalgamated zinc powder, and a cathode or depolarizer member of a readily reducible metallic oxide such as manganese dioxide or mercuric oxide.

The most common of the secondary cells is the so-called nickel-cadmium cell. This cell utilizes an anode comprised of powdered cadmium metal and a cathode comprised of an oxide of nickel. Still another commercial alkaline cell utilizes amalgamated zinc powder as the anode and silver oxide as the cathode.

Alkaline cells have enjoyed wide public acceptance for a number of reasons. The primary alkaline cell offers a discharge capacity of as much as three or four times as great as that of traditional dry cells of comparable size. The secondary cell offers the prime advantage that, since the reactions which take place during discharge and recharge so nearly approach reversibility, the cells may be charged and discharged through a large number of cycles before they are rendered unusable. Both primary and secondary alkaline cells have a low uniform internal impedance during discharge, and consequently the voltage under current drain remains almost constant until the cell is exhausted. An additional advantage enjoyed by both types is that high discharge rates may be used without causing harm to the cell.

In order to be suitable for general commercial use, alkaline cells, both primary and secondary, must be provided with air-tight or hermetically sealed containers. There are several reasons for this requirement. First, the cells are often used in expensive electronic equipment, where any leakage of the cell electrolyte must be prevented. Second, the cells must be sealed from the atmosphere, since carbon dioxide normally present in the atmosphere would react with the alkaline electrolyte to produce carbonates, exhausting the electrolyte and reducing the useful life of the cell.

During certain phases of the normal operation of an alkaline cell, gases may develop therein. In the primary cell, gases may develop during the latter part of the discharge period, especially if the cells are over-discharged. Gases may also form during normal discharge if the discharge rate is excessive. In the secondary cell, gases may be formed during excessively high discharge or overdischarge. In addition, gases are normally generated during the latter part of the charge cycle and during over-charge. Although excessive over-charge is undesirable, a certain amount must be tolerated by the cell since it is generally not practical to determine the exact point of full charge and to stop the charging process exactly at that point.

Numerous venting means for hermetically sealed or airtight cells have been disclosed in the prior art. In one type a closed crack or split is provided in the wall of the cell container, permitting the crack or split to rupture when the gas pressure becomes excessive. In another the cell wall is weakened at a point, enabling it to rupture at a predetermined gas pressure. In most cases, the means disclosed for venting gases may be characterized as emergency expedients and not adaptable for venting gases under normal continued use. Even when prior art means for venting gas under normal operating conditions have been disclosed, the means have not been susceptible of the necessary precision in predetermining the venting pressure.

It is an object of the invention to provide a valve for the controlled relief venting of fluids from an enclosure at a pressure which may be predetermined within precise limits.

It is further an object to provide a gas venting means for a voltaic cell enclosure which is relatively inexpensive and simple to construct.

It is further an object to provide a hermetically sealed voltaic cell enclosure having means for venting gases which have accumulated to form an abnormally high pressure, and wherein the sealed state is restored after sufficient gas has been vented to the atmosphere to restore the internal cell pressure to a value below that of the venting pressure.

Other objects and advantages of the invention will become more apparent from the following description when taken in conjunction with the accompanying drawing in which.

Figure 2:
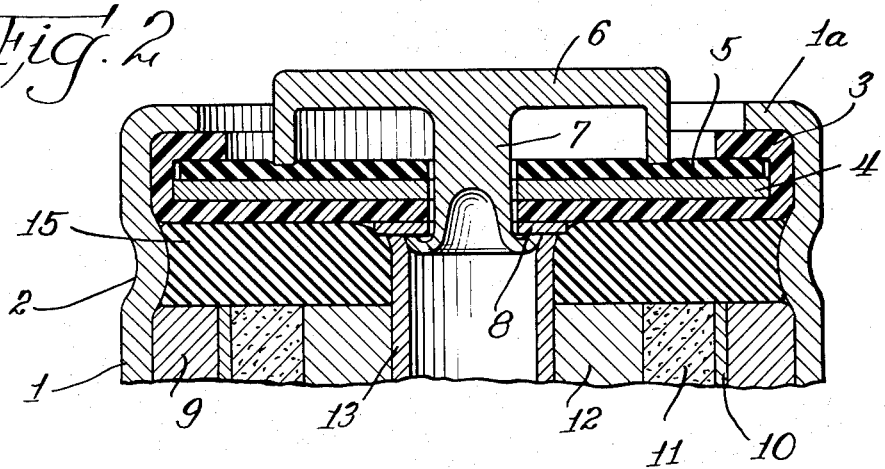
FIG. 2 is an enlarged fragmental view of the structure of FIG. 1 showing the closure structure.
Figure 1:
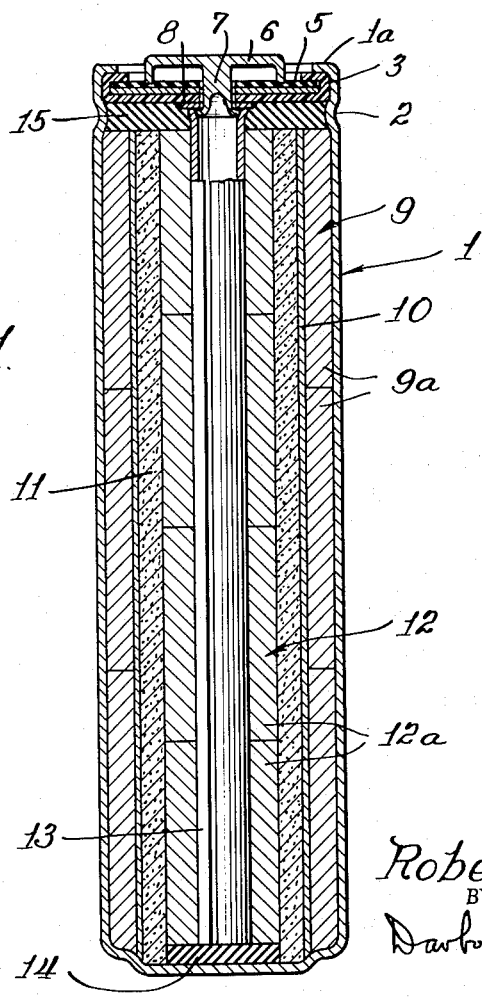
FIG. 1 is a cross-sectional view of a voltaic cell containing the venting valve of the invention.

Referring to the drawing, the cell container is comprised of a steel cylindrical can 1 having a circular bead 2 provided near one end for supporting the closure structure. Above the bead is contained a sealing gasket 3 in the form of a cup composed of an electrically non-conductive sealing material such as nylon or neoprene. Within the sealing gasket is contained a thin resilient diaphragm 4 composed of a material such as spring steel. Cemented to the diaphragm 4 is a disc 5 of a flexible sealing material such as neoprene. A sealing cup 6 engages and forms a seal with the neoprene gasket 5. Affixed to the sealing cup 6 is a vertical rivet shaft 7 extending through axial holes in the neoprene disc 5, the diaphragm 4, the nylon gasket 3, and through a hole in a metallic contact disc 8. The end of the rivet is upset over the contact disc with sufficient force to cause the edge of the sealing cup to form a seal against the neoprene disc 5. The holes in all the structures through which the rivet shaft 7 passes is made sufficiently large so that gas can readily pass between the shaft and the edges of the holes and enter the space confined between the sealing cup 6 and the neoprene disc 5. The edge of the can 1a is rolled over the sealing gasket 3 with sufficient force both radially and axially to cause the gasket to seal against the edge of the flexible steel diaphragm 4. The closure structure is supported by the bead 2.

Positioned in close electrical contact with the can 1 is a cylindrical depolarizer cathode 9. To promote ease of assembly, the cathode 9 is formed from a plurality of separately molded sleeve segments 9a which are individually inserted into the can.

A thin barrier membrane 10 is positioned at the inner surface of the tubular cathode to prevent the cathode material from migrating to the interior portion of the cell. Within the barrier membrane 10 is a tubular separator 11 composed of a bibulous material such as webril. The major proportion of the cell electrolyte is contained in the separator.

A tubular anode 12 is contained within the separator. The anode is comprised preferably of powdered metal molded under pressure in the form of short tubes 12a. A plurality of the tubes are inserted into the central portion of the cell.

In order to provide good electrical contact between segments of the anode, and the external terminal of the cell, a contact spring member 13 is inserted inside the anode. In the form shown, the contact spring member is a split tube commonly termed a "roll pin." In order to provide good contact, the outer diameter of the roll pin should be slightly larger than the inner diameter of the anode, so that a constant outward radial force is exerted by the roll pin against the anode. The roll pin is in contact engagement with the turned over end of the rivet 7 and with the contact disc 8. An insulating disc 14 of a resilient material such as neoprene both insulates the roll pin from the bottom of the can 1, and provides an upward axial force urging the roll pin against the contact disc 7. An insulating washer 15 separates the cell elements from the closure structure.

The material used for forming the cathode may be any one of the easily reducible metal oxides commonly used in the battery art, such as manganese dioxide, mercuric oxide, silver oxide, copper oxide or an oxide of nickel. When relatively non-conductive materials are used, as for example manganese dioxide or mercuric oxide, a minor proportion of a conductive material such as graphite or a carbon black such as acetylene black must be added in order to increase the conductivity of the depolarizing mixture. Silver oxide is generally in itself sufficiently conductive so that additional conductive materials need not be added. Suitable depolarizer compositions may be prepared by mixing together about nine parts manganese dioxide and about one part finely divided graphite, or about ten parts mercuric oxide and one part graphite. In the case of the nickel-cadmium cell, powdered metallic nickel may be added to the oxide in order to increase conductivity. The depolarizer mixture is preferably molded under pressure to the desired form. Where a tubular cathode is to be utilized, it has been found convenient to mold the cathode in the form of a plurality of tubes which are individually inserted, as shown in the drawing. The outer diameter of the depolarizer tubes should be so chosen that a tight press fit will result when they are inserted into the can 1, so that good electrical contact between the cathode and the can will result.

The function of the barrier member 10 is to prevent depolarizer particles from migrating to the central portion of the cell and thereby causing a short circuit. It must be composed of a material which is sufficiently resistant to the electrolyte so that it will not be decomposed, and yet must be sufficiently permeable so that the electrolyte may pass freely therethrough. Suitable barrier materials are parchment paper, sodium carboxymethylcellulose, porous polymeric films of a material such as vinyl chloride, and other barrier materials which are known to the art.

The bibulous separator 11 may be composed of any electrolyte-absorbent material which is not adversely affected thereby. A suitable material is webril, a non-woven fabric made by blending thermoplastic fibers into a cotton web and applying heat and pressure.

The electrolyte may be chosen from among any of those suitable for the particular electrochemical system used. A preferred alkaline electrolyte has the following composition:

| | Percent |
|---|---|
| KOH | 28 |
| ZnO | 6 |
| $H_2O$ | 66 |

The zinc oxide component is utilized only where the anode is comprised of zinc. Its function is that of an inhibiting agent to protect the zinc anode from excessive dissolution in the electrolyte, especially during the period when no current is being drawn from the cell.

The anode is composed of an electronegative metal. In the mercury, manganese dioxide, and silver cells, zinc is the preferred anodic metal. The anode may be fabricated by placing the metal in the form of amalgamated powder into molds of desired size and shape, and molding the structure under pressure. In the case of a nickel-cadmium cell, the anode is comprised of powdered cadmium or, alternatively, cadmium oxide, when the cell is assembled in the discharged state.

One of several methods may be used for assembling the cell shown in the drawing. In one method the end of the can is first flared outwardly to form a flange so that the end portion has a diameter somewhat greater than that of the remaining portion of the can. The active cell ingredients are first inserted in the normal manner. The closure, comprised of the nylon gasket 3, the contact disc 8, the diaphragm 4, the neoprene sealing disc 5, and the sealing cup 6 having the rivet shaft 7 the end of which is upset over the contact disc 8 to provide clamping force is then inserted into the enlarged portion of the cell. The lip of the can is then rolled over to retain the closure members. The can is finally drawn through a forming tool having a hole with a diameter only sufficiently great to permit the unflared portion of the can to pass freely through. As the entire can is forced through the hole, the flared portion is compressed radially inward with sufficient clamping force to provide a tight seal between the can 1, the sealing gasket 3, and the diaphragm 4. The closure structure is retained axially between the rolled over lip of the can and the circular groove or bead which results when the flange is drawn through the hole of the forming tool.

Alternatively, a can of uniform diameter may be utilized, a bead rolled into the can wall above the upper limit of the active elements in such a manner as to act as a lower axial support for the closure. The closure elements are then inserted and the rim of the can rolled thereover to provide clamping force against the gasket and diaphragm.

The fluid venting valve according to the invention operates in the following manner: Under normal conditions the diaphragm 4, which is preferably composed of thin resilient spring steel, rests in substantially flat position with its edge in sealing engagement with the sealing gasket 3 as the result of the clamping force supplied by the container lip. A permanent air-tight or hermetic seal is thus provided between the edge of the diaphragm 4 and the container.

The holes provided in the contact disc 8, the gasket 3, the diaphragm 4, and the sealing disc 5 are sufficiently large so that fluid or gas in the case of voltaic cells, is free to pass between the rivet shaft 7 and the hole walls. Consequently, although a hermetic seal is provided between the edge of the diaphragm 4 and the container, a fluid may still pass freely from the interior of the container into the space between the sealing cup 6 and the neoprene sealing disc 5. Escape of the fluid within this cavity is prevented by the hermetic seal established between the sealing cup lip and the neoprene disc 5, which are in clamping engagement as the result of the upsetting of the end of the rivet shaft 7. The fluid is unable to escape between the diaphragm 4 and the neoprene disc 5, since they are cemented together.

When fluid, such as gas in the case of a voltaic cell, forms, the increased pressure causes the nylon gasket 3, the steel diaphragm 4 and the neoprene gasket to bow outward. The rivet shaft 7 is also permitted to rise by the bowing process. As the degree of bowing increases, the seal between the edge of the sealing cup and the neoprene gasket 5 weakens, since the sealing cup moves a greater distance than the peripheral portion of the neoprene gasket. When a certain predetermined pressure has been attained, the seal between the sealing cup and the neoprene gasket weakens sufficiently so that fluid is permitted to vent therebetween. When the pressure in the cell has been sufficiently reduced as a result of the venting action, the steel diaphragm tends to force the structure back to its original position, reestablishing the seal.

The pressure at which fluid will first vent is determined by several factors, among them the force used in upsetting the rivet end as a determinant of the normal clamping force exerted by the sealing cup lip against the neoprene sealing disc 5, and additionally by the dimensions and properties of the flexible steel diaphragm 4. For applications in alkaline cells as described above, a gas venting pressure of 135 pounds per square inch has been found to be entirely satisfactory and may be readily effected through the proper choice of the operative variables.

Although the invention has been described in detail in relation to only relatively few specific embodiments, it is to be understood that many variations may be practiced by those skilled in the art without departing from the spirit or scope thereof, within the limits defined by the appended claim.

Invention is claimed as follows:

In a voltaic cell which includes as a part thereof a cylindrical metal can open at its top, closure and terminal structure comprising a centrally apertured spring steel diaphragm, means for sealingly supporting said diaphragm at its periphery at the top of said can, a centrally apertured electrically non-conductive resilient sealing disc upon said diaphragm in sealing engagement therewith, a metallic valve member having a cup-form valve head and a valve stem extending through the central apertures of said sealing disc and said diaphragm, the edge of said cup-form valve head engaging the top surface of said sealing disc, the end of said valve stem being upset to clamp the valve head against said sealing disc with force of predetermined magnitude to form a seal, the upset end of said valve stem having a smaller diameter than the diameter of said valve head, a resilient non-conductive disc at the bottom of said can, and a conductive member extending axially of said can between said last mentioned disc and said valve stem for electrically connecting an electrode of said cell with said valve member, the arrangement being such that said can remains hermetically sealed under normal pressure conditions and whereby increased pressure within said can of a predetermined magnitude causes said diaphragm to bow outwardly permitting the edge of said valve head to recede from said sealing disc sufficiently to permit gas to escape from said cell.

References Cited in the file of this patent
UNITED STATES PATENTS

| | | |
|---|---|---|
| 1,990,463 | Reinhardt | Feb. 5, 1935 |
| 2,062,107 | Reinhardt | Nov. 24, 1936 |
| 2,115,340 | McCrosson | Apr. 26, 1938 |
| 2,829,186 | Kort | Apr. 1, 1958 |
| 2,934,584 | Warren et al. | Apr. 26, 1960 |